(12) United States Patent
Haselhorst

(10) Patent No.: US 9,944,321 B2
(45) Date of Patent: Apr. 17, 2018

(54) FRONT AXLE SUPPORT HAVING AN ATTACHMENT DEVICE FOR A STEERING SYSTEM HOUSING

(71) Applicant: Autotech Engineering Deutschland GmbH, Bielefeld (DE)

(72) Inventor: Kai Haselhorst, Versmold (DE)

(73) Assignee: Autotech Engineering Deutschland GmbH, Bielefeld (DE)

( * ) Notice: Subject to any disclaimer, the term of this patent is extended or adjusted under 35 U.S.C. 154(b) by 0 days.

(21) Appl. No.: 15/164,020

(22) Filed: May 25, 2016

(65) Prior Publication Data
US 2016/0347369 A1 Dec. 1, 2016

(30) Foreign Application Priority Data

May 26, 2015 (EP) ..................... 15169184

(51) Int. Cl.
*B62D 21/11* (2006.01)
*B60G 21/055* (2006.01)

(52) U.S. Cl.
CPC .......... *B62D 21/11* (2013.01); *B60G 21/0551* (2013.01); *B60G 2204/15* (2013.01); *B60G 2206/60* (2013.01); *B60G 2206/8201* (2013.01)

(58) Field of Classification Search
CPC ....................................................... B62D 21/11
USPC .................................................. 280/124.109
See application file for complete search history.

(56) References Cited

U.S. PATENT DOCUMENTS

| 8,083,244 B2 | 12/2011 | Buschjohann et al. |
| 8,590,908 B2 | 11/2013 | Kroger et al. |
| 2008/0048409 A1* | 2/2008 | Takahashi ................ B60G 7/02 |
| | | 280/124.116 |

FOREIGN PATENT DOCUMENTS

| CN | 101855124 A | 10/2010 |
| DE | 102009040821 B3 | 6/2011 |
| DE | 102010033333 A1 | 2/2012 |
| DE | 102013011546 A1 | 1/2015 |
| EP | 1630073 A2 | 3/2006 |
| EP | 1712450 B1 | 12/2009 |
| FR | 3000933 A1 | 7/2014 |

\* cited by examiner

*Primary Examiner* — Faye M Fleming
(74) *Attorney, Agent, or Firm* — The Webb Law Firm

(57) ABSTRACT

The invention relates to a front axle support for a motor vehicle, including side members and a crossmember interconnecting the side members, the crossmember being in the form of a hollow body and being provided with at least one attachment device for attaching a steering system housing.

15 Claims, 4 Drawing Sheets

FRONT AXLE SUPPORT HAVING AN ATTACHMENT DEVICE FOR A STEERING SYSTEM HOUSING

CROSS-REFERENCE TO RELATED APPLICATION

This application claims priority to European Patent Application No. 15169184.7 filed May 26, 2015, the disclosure of which is hereby incorporated in its entirety by reference.

BACKGROUND OF THE INVENTION

Field of the Invention

The invention relates to a front axle support for a motor vehicle, comprising side members and a crossmember interconnecting the side members, the crossmember being in the form of a hollow body and being provided with at least one attachment device for attaching a steering system housing.

Description of Related Art

In this case, "side members" are understood as being supporting elements or portions of supporting elements of the front axle support that extend substantially along the longitudinal axis of the motor vehicle in question when the front axle support is fitted.

Front axle supports of this type (also referred to as auxiliary frames or subframes) are known in many different designs. They should be as light as possible while having high rigidity and stiffness, and typically comprise bearing retainers for wheel control elements and attachment points for the steering system housing (e.g. the steering gear housing) and other units so as to allow complete front axle modules having drive units to be installed in the form of a preassembled unit.

DE 10 2009 040 821 B3 discloses a front axle support having an integrated steering system housing and a transverse structure that forms a housing for a steering gear, supporting elements that are formed as side members and comprise holders for bearing wheel control elements being connected to the transverse structure by welded connections. In one embodiment, each supporting element is formed of sheet metal shells that have been welded together, the transverse structure being formed from a central portion of the sheet metal shells and a steering system housing made of steel. In the region of the front axle, this front axle support provides extra installation space while at the same time reducing the weight. However, it is relatively complex to fit the steering gear in the steering system housing fixedly integrated in the front axle support.

EP 1 712 450 B1 discloses an auxiliary frame for motor vehicles, comprising auxiliary-frame side members that are interconnected by means of a crossmember. A planar stiffening element in the form of a sandwich component is arranged between the side members. A steering system housing containing a steering gear is also fitted on the auxiliary frame. The steering system housing is fastened at four points, two of these fastening points being formed on the crossmember and the other two fastening points being formed on link brackets connected to the side members. In this case, the fastening points are arranged such that the longitudinal axes of the fitted fastening screws extend transversely or substantially perpendicularly to a vehicle vertical axis (z-axis), whereas the fastening points for the planar stiffening element are arranged such that the fastening screws thereof are guided from below and the longitudinal axes of said fastening screws extend substantially in parallel with the vehicle vertical axis when fitted. This auxiliary frame can be improved upon in particular in terms of convenient fitting of the steering system housing.

DE 10 2010 033 333 A1 discloses an auxiliary frame that comprises two side members and at least one crossmember, and on which fastening points for wheel suspension elements and unit bearings are also provided. The crossmember is flat or planar and stiffened by a steering gear housing. In addition, the auxiliary frame is provided with a stiffening element that extends between the side members and is rigidly connected to the crossmember. In one embodiment, in order to be secured to the crossmember, the steering gear housing is arranged having opposing housing regions between the side members and the crossmember in each case, fastening screws being provided which, starting from the crossmember or side member, can be screwed into the side member or crossmember, respectively, through corresponding housing regions. In this case, the steering gear housing is mounted onto the crossmember from above when viewed in the direction of the vehicle vertical axis.

SUMMARY OF THE INVENTION

The object of the invention is to provide a front axle support of the type mentioned at the outset that has high flexural rigidity while being lightweight, and allows the steering system housing to be fitted in a convenient manner in that said housing can be both supplied to the crossmember and attached thereto from below, when viewed in the direction of the vehicle vertical axis.

To achieve said object, the attachment device is formed by a shaped metal part which defines a recess, is inserted into a cavity arranged in the front or back of the crossmember and welded to the crossmember, is open underneath and along a vertical portion of at least 20 mm, preferably at least 30 mm, and comprises an opening at the upper end of the vertical portion, preferably a hole for receiving a fastening element that is or can be connected to the steering system housing.

The front axle support according to the invention, which can also be referred to as an auxiliary frame or subframe, allows the steering system housing to be fitted in a convenient manner, and specifically in particular such that the steering system housing can be both supplied to the crossmember and attached thereto from below. For this purpose, at least one fastening arm or fastening tab can be formed on or welded to the steering system housing, for example, which arm or tab is moved along the recess in the shaped metal part welded to the crossmember when the steering system housing is being fitted in order to ultimately be positioned close to the opening or hole for receiving the fastening element, for example a threaded bush, a nut or a screw, which is or can be connected to the steering system housing. By means of the shaped metal part which has a recess and the welded connection of said part to the crossmember, the crossmember and thus the front axle support are considerably stiffened.

The crossmember in the form of a hollow body preferably has a closed profile. For this purpose, the crossmember can, for example, be composed of or consist of two interconnected L-profiles, a C-profile or a U-profile having a covering connecting the legs thereof, or a tubular profile, for example a square hollow profile. In particular, the crossmember can be composed of an upper sheet metal shell and a lower sheet metal shell connected thereto. The shaped metal part is welded to at least one profiled part or to at least one sheet metal shell of the crossmember. Preferably, the shaped metal part is welded to both an upper sheet metal shell and a lower sheet metal shell of the crossmember.

Owing to the cavity arranged in the front or back of the crossmember and the shaped metal part, which has a recess, inserted therein, space is also saved or the useful installation space is increased on the front axle support. The shaped metal part and the integration thereof according to the invention in the crossmember can be implemented cost-effectively. The shaped metal part can be formed as a single piece or can be produced from relatively few individual parts, in particular from just two individual parts. The shaped metal part can be rigidly and reliably connected to the crossmember by either a single welding operation or a few welding operations. Since the front axle support according to the invention only has relatively few individual parts for attaching the steering system housing, it is light in comparison. In addition, the high flexural rigidity thereof allows the sheet thickness of at least one profiled element or at least one sheet metal shell of the crossmember to be reduced, and thus allows for a reduction in weight.

An advantageous embodiment of the invention is characterised in that the shaped metal part is in the form of a channel-shaped shell, preferably a sheet metal shell. In this case, the cross section of the shell can have a substantially U-shaped or arcuate profile, in particular an almost semi-circular profile. A shaped metal part of this type can be produced relatively simply by deforming a sheet metal blank and, once welded to the crossmember, provides said crossmember with exceptional flexural rigidity while having a comparably low weight.

Another advantageous embodiment of the invention is characterised in that the shaped metal part comprises a flange on its lower end. The flange stiffens the shaped metal part. In particular, the flange makes it possible to form the cavity in the front or back of the crossmember, into which cavity the shaped metal part is inserted, to have a slightly larger play with respect to the shaped metal part, so it is possible to place the shaped metal part in a floating manner relative to the crossmember and thus to compensate for tolerances in the x/y-direction in a simple manner. If necessary, the shaped metal part can thus be inserted into the cavity with a radial play that is sufficient for high tolerance compensation. Thereby the flange engages in the recess in the crossmember from below, for example engages in a corresponding notch in a lower sheet metal shell or a lower profiled part of the crossmember from below, and is used as a weld connection portion of the shaped metal part inserted into the cavity.

According to another advantageous embodiment of the invention, the shaped metal part is produced by splitting a metal sleeve or a sheet metal bowl. The metal sleeve can in particular be a flange sleeve. Likewise, the sheet metal bowl can have a corresponding radially protruding flange. This embodiment allows the shaped metal part to be produced in a particularly cost-effective manner since two shaped metal parts can be obtained in each case from one single-piece metal sleeve or one single-piece sheet metal bowl. Producing the shaped metal part from a single-piece sheet metal cup is also advantageous in that the bottom of the sheet metal bowl can be used as the location for the hole or opening for receiving a fastening element that is or can be connected to the steering system housing. There is thus no need for an additional connection operation, for example a welding operation, in order to attach to the shaped metal part a receiving element having the hole or opening for receiving a fastening element that is or can be connected to the steering system housing. On the other hand, it is possible for a receiving element of this type, which is for example produced separately from the metal sleeve or channel-shaped shell in the form of a metal plate (metal blank) having a hole and which radially overlaps said shell when fitted, to be positioned in a floating manner relative to the crossmember or to the shaped metal part welded to the crossmember, thus again making it possible to compensate for tolerances in the x/y-direction in a simple manner.

In one embodiment of the front axle support according to the invention in particular, the hole for receiving the fastening element is formed in a cover-like metal plate (metal blank) rigidly connected to the shaped metal part. In this case, the metal plate (metal blank) and the crossmember are preferably welded together. In this case, the metal plate (metal blank) can be substantially planar. No additional deformation step is therefore required. Preferably, however, the metal plate comprises a collar that extends at least along a portion of the length of the periphery of said plate.

The fastening element associated with the steering system housing can be rigidly or detachably connected to the attachment device of the front axle support according to the invention. According to an advantageous embodiment, the fastening element is in the form of a nut or a threaded bush. In this case, the nut or threaded bush is inserted into the hole in the attachment device or arranged in alignment with the hole and is connected in each case to the shaped metal part or the above-mentioned receiving element (metal plate), for example by means of a welded or screw connection.

Another advantageous embodiment of the front axle support according to the invention is characterised in that the crossmember has a shoulder at the top in the region of the cavity. The shoulder also increases the flexural rigidity of the front axle support or the crossmember thereof. In this case, the shoulder is defined, for example, by a ridge-shaped or bead-shaped raised portion on the crossmember. This measure for improving the flexural rigidity can advantageously be implemented when an upper sheet metal shell or an upper sheet metal part of the crossmember is shaped. Preferably, the ridge-shaped or bead-shaped raised portion has a curved longitudinal progression, since this improves the flexural rigidity in several directions at once.

According to a particularly preferred embodiment, the crossmember of the front axle support according to the invention is provided with at least two attachment devices of the aforementioned type. This not only allows the steering system housing to be attached to the crossmember of the front axle support in a sturdy and reliable manner, but also further improves the flexural rigidity of the crossmember or front axle support while having a low component weight. Additional attachment devices for the steering system housing, for example in the form of brackets, are preferably attached to the side members.

In terms of high flexural rigidity of the crossmember or front axle support alongside a low component weight, it is also advantageous if, in accordance with another embodiment of the invention, the shaped metal part and at least one sheet metal shell and/or at least one profiled part of the crossmember are made of sheet steel of different thicknesses and/or of different grades. As a result of this, the flexural rigidity of the crossmember or front axle support can be optimised while keeping the component weight the same or even reducing the component weight.

BRIEF DESCRIPTION OF THE DRAWINGS

The invention will be explained in more detail below on the basis of the drawings, which show an embodiment and in which.

DETAILED DESCRIPTION OF THE INVENTION

Figure 1:
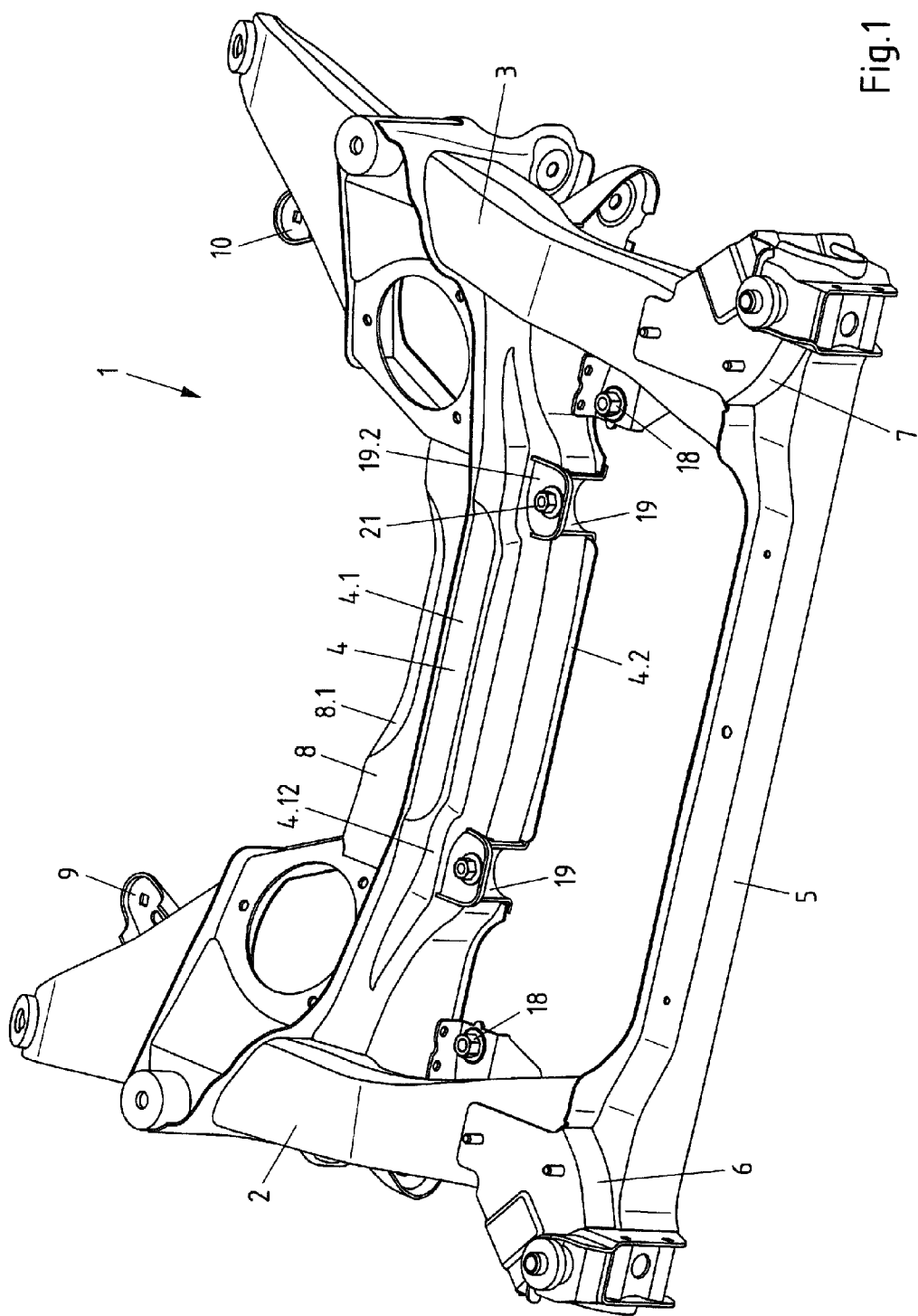
FIG. 1 is a perspective view of a front axle support according to the invention without a steering system housing.

The drawings show a front axle support (auxiliary frame) 1 for a motor vehicle, comprising side members 2, 3 and a crossmember 4 interconnecting the side members. The crossmember 4 is in the form of a hollow body. In this case, for example, it is formed from an upper sheet metal shell 4.1 and a lower sheet metal shell 4.2. The upper sheet metal shell 4.1 and the lower sheet metal shell 4.2 each have, for example, a substantially L-shaped cross-sectional profile. The side members 2, 3 are likewise preferably in the form of hollow bodies. For example, they are each constructed from an upper sheet metal shell and a lower sheet metal shell that are welded together.

Furthermore, the front axle support 1 is provided with a cross-beam 5 on its front end, which connects the side members 2, 3. The cross-beam 5 is, for example, composed of a tube and shaped sheet metal parts 6, 7 welded to the ends thereof.

Furthermore, the front axle support 1 comprises a supporting and stiffening element 8, which is formed for example from an upper sheet metal shell 8.1 and a lower sheet metal shell 8.2 connected thereto by means of welding. The upper sheet metal shell 8.1 extends along a central portion of the crossmember 4 and directly adjoins said crossmember. The ends of the lower sheet metal shell 8.2 are connected to the side members 2, 3. Holders or brackets 9, 10 are attached to the side members 2, 3 for bearing the vehicle engine or drive components. In addition, bracket plates 11, 12 for bearing components of a chassis suspension are attached to the side members 2, 3, said bracket plates 11, 12 also being welded to the crossmember 4 and to the upper sheet metal shell 8.1 of the supporting and stiffening element 8.

Mounts for bearing wheel control elements 13, 14, in particular transverse control arms, are formed on the front axle support (auxiliary frame) 1. The mounts are arranged, inter alia, on the front ends of the side members 2, 3 when viewed in the direction of travel, or in the region of the shaped sheet metal parts 6, 7 of the cross-beam 5. Furthermore, the ends of the upper sheet metal shell 4.1 and of the lower sheet metal shell 4.2 of the crossmember are formed such that they define fork-shaped mounts for rotatably bearing a transverse control arm 13. In this case, each fork-shaped mount consists of one end of the upper sheet metal shell 4.1 and one end of the lower sheet metal shell 4.2.

To attach a steering system housing 15, e.g. a steering gear housing or steering system cylinder, the front axle support 1 is provided with a plurality of attachment devices, preferably four attachment devices 16.1, 16.2, 17.1, 17.2. The attachment devices 16.1, 16.2, 17.1, 17.2 are designed so that the steering system housing 15 can be fitted during production substantially vertically in the positive z-direction. In other words, the attachment devices 16.1, 16.2, 17.1, 17.2 associated with the steering system housing 15 are formed and arranged such that the steering system housing 15 can be both supplied to the front axle support 1 and fitted thereon from below, when viewed in the vehicle vertical axis direction. Two attachment devices 16.1, 16.2 are provided on the crossmember 4 and two other attachment devices 17.1, 17.2 are provided on the side members 2, 3. The four attachment devices 16.1, 16.2, 17.1, 17.2 define a four-point steering system attachment. The attachment devices 17.1, 17.2 on the side members 2, 3 are, for example, in the form of bracket plates that are each provided with a threaded drilled hole or a nut 18 and are welded to one of the side members. The attachment devices 16.1, 16.2 attached to the crossmember 4 are each formed by a shaped metal part 19 which defines a recess, is inserted into a cavity formed in the front of the crossmember 4, and is integrally bonded, preferably welded, to the upper sheet metal shell 4.1 and the lower sheet metal shell 4.2. The cavity formed in the crossmember 4, in which the shaped metal part 19 is arranged, can also be referred to as a notch or hollow.

The shaped metal part 19 integrated in the crossmember 4 is open on its underside and along a vertical portion of at least 20 mm that extends from an underside of the lower sheet metal shell 4.2 preferably up to a top side of the upper sheet metal shell 4.1. At the top end of the open vertical portion, the shaped metal part 19 has an opening 20, for example a hole, for receiving or arranging in an aligned manner a fastening element 21 that can be connected to the steering system housing 15.

Figure 2:
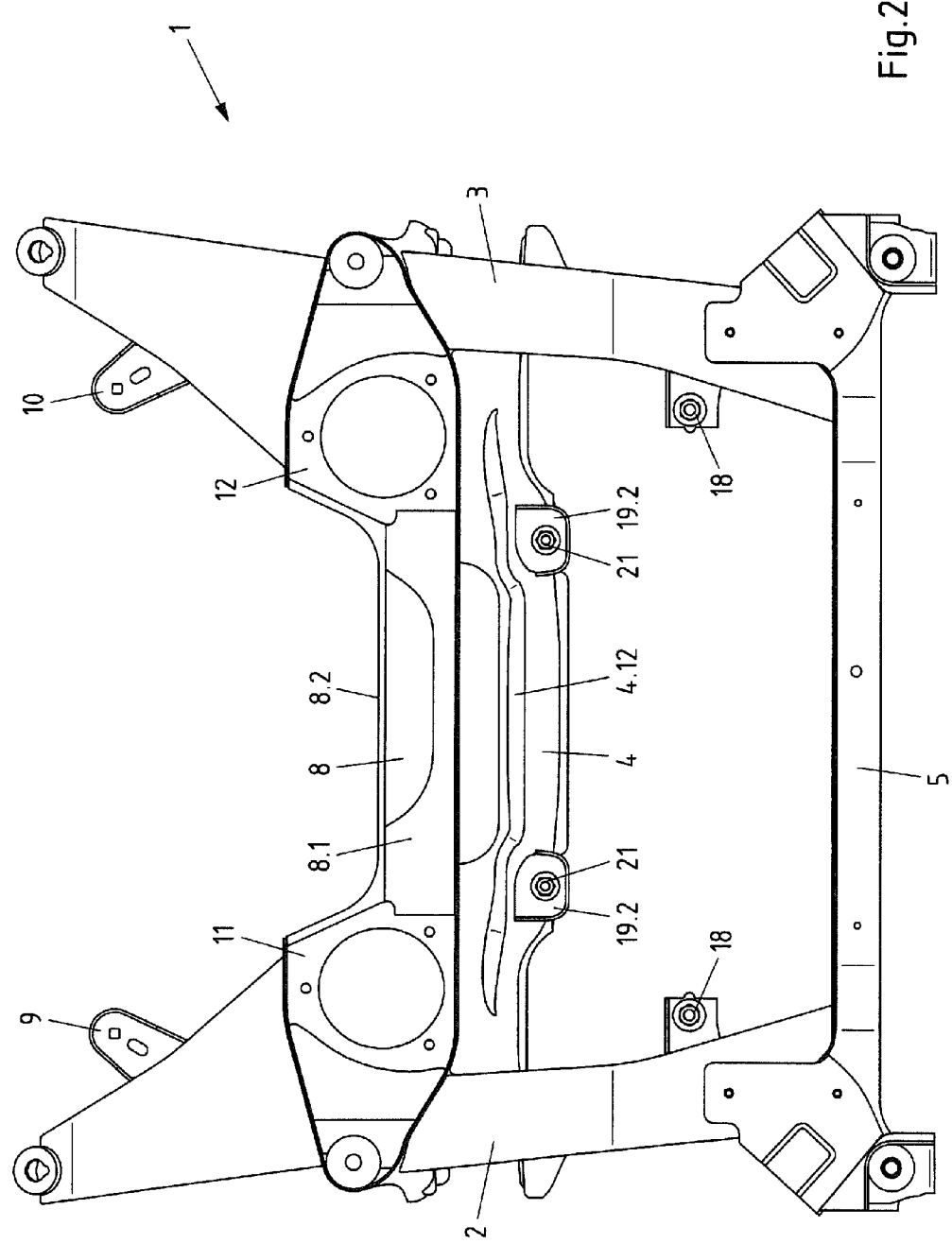
FIG. 2 is a plan view of the front axle support from FIG. 1 without a steering system housing.
Figure 3:
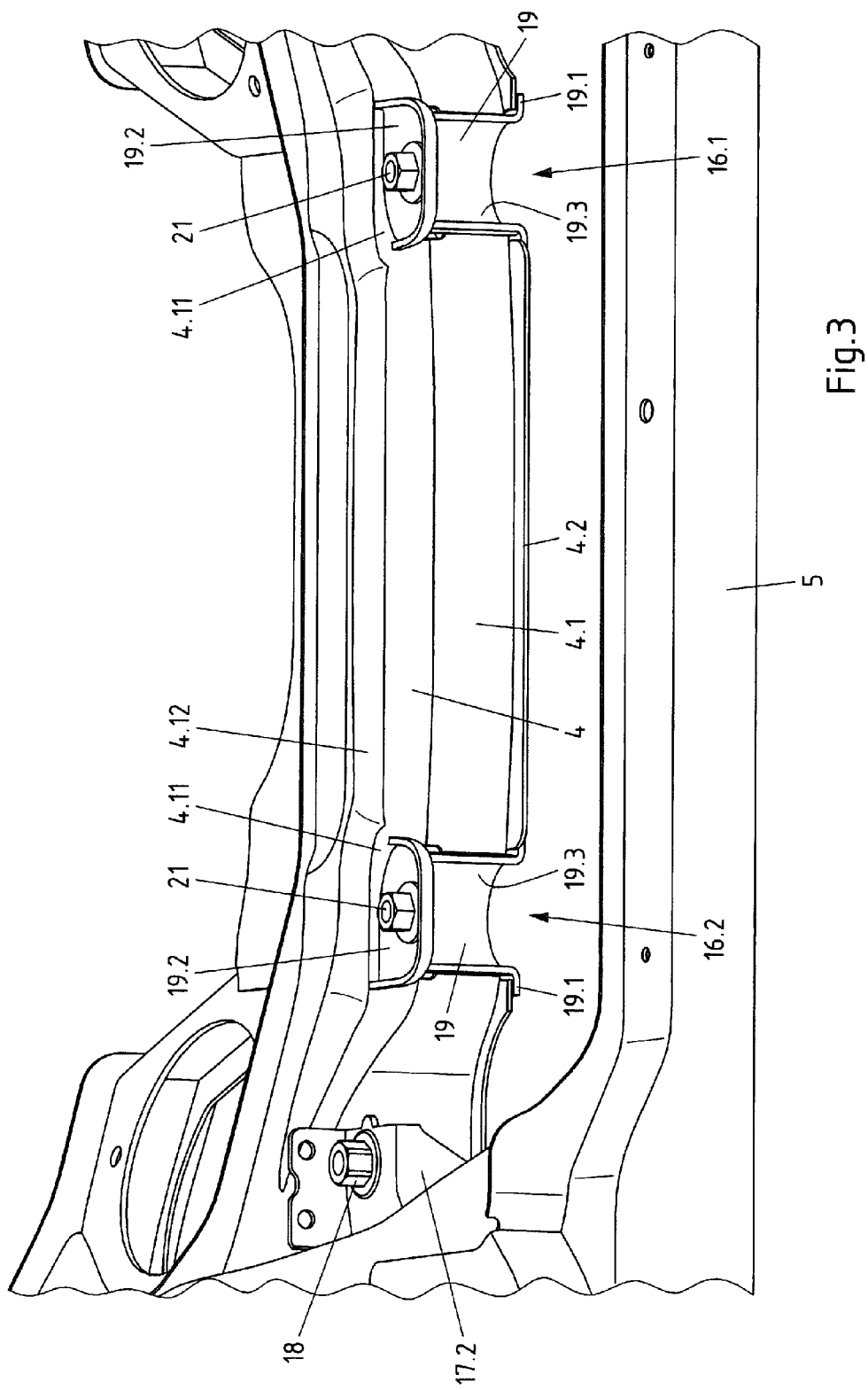
FIG. 3 is an enlarged view of a portion of the front axle support from FIG. 1 together with the crossmember thereof.

In the embodiment shown in the drawings, the shaped metal part 19 is in the form of a channel-shaped shell. In cross section, the shaped metal part 19 has a U-shaped or approximately semicircular profile. At its lower end, it has a flange 19.1 that grips the lower sheet metal shell 4.2 of the crossmember 4 from below. A metal plate (metal blank) 19.2, which is provided with the opening 20, preferably a hole, for receiving the fastening element 21 that can be connected to the steering system housing 15, is arranged on the upper end of said shaped metal part in the manner of a cover. The metal plate 19.2 protrudes radially beyond the channel-shaped part 19.3 of the shaped metal part 19 and is rigidly connected, for example welded, thereto and/or to the upper sheet metal shell 4.1 of the crossmember 4. The metal plate 19.2 can comprise an upwardly protruding collar on its periphery, which collar extends over a portion of the length of the plate periphery, as shown in FIGS. 1 to 3. The longitudinal portion of the periphery of the metal plate 19.2 on which the collar is not provided is preferably used as a joint edge for welding the metal plate 19.2 to the crossmember 4.

The fastening element 21 received in the opening 11 in the metal plate 19.2 or arranged therein in an aligned manner consists, for example, of a threaded bush or a nut. The nut 21 is rigidly connected, for example welded, to the metal plate 19.2. The threaded bush or nut 21 preferably comprises a flange, by which it abuts the metal plate 19.2.

To produce the shaped metal parts 19 of the attachment devices 16.1, 16.2, for example a tube or a metal sleeve can be used, which is split, in particular halved, in the axial direction. In the process, a flange sleeve is preferably used as the metal sleeve. By welding each channel-shaped shaped metal part 19 into the crossmember 4, the upper sheet metal shell 4.1 and lower sheet metal shell 4.2 thereof are rigidly interconnected and the crossmember 4 is considerably stiffened.

Instead of a tube or a metal sleeve, in particular a flange sleeve, that is split, for example in half, and then provided with a cover-like metal plate 19.2, it is also possible to use a sheet metal bowl, preferably a sheet metal bowl having an integrally moulded flange, to produce a shaped metal part 19. In this case, the channel-shaped part 19.3, the flange 19.1 and the cover-like part 19.2 together form a single-piece shaped metal part 19 that is welded into the front cavity (hollow) in the crossmember 4 to attach the steering system housing 15.

However, an embodiment according to the example shown in the drawings is particularly preferred, in which the channel-shaped part 19.3 of the shaped metal part 19 is provided with a metal blank (metal plate) 19.2 which has the opening 20 for receiving the fastening means 21 and protrudes radially beyond the channel-shaped part 19.3. This is because an embodiment of this type allows the attachment device 16.1, 16.2 to be installed in a particularly simple manner in terms of the required tolerances, it being possible to place (position) the metal blank 19.2 in a floating manner relative to the channel-shaped part 19.3 or the crossmember 4.

Preferably, the cavity (hollow) in the hollow crossmember 4 composed of the sheet metal shells 4.1, 4.2, into which cavity the shaped metal part 19, e.g. the half of a flange sleeve split in the axial direction, is inserted, is slightly wider than the largest external dimension of the cross-sectional profile of the shaped metal part 19, and so said part can be inserted into the cavity (hollow) with radial play and thus can be positioned in a floating manner relative to the crossmember 4 before the welded connection is produced.

Figure 4:
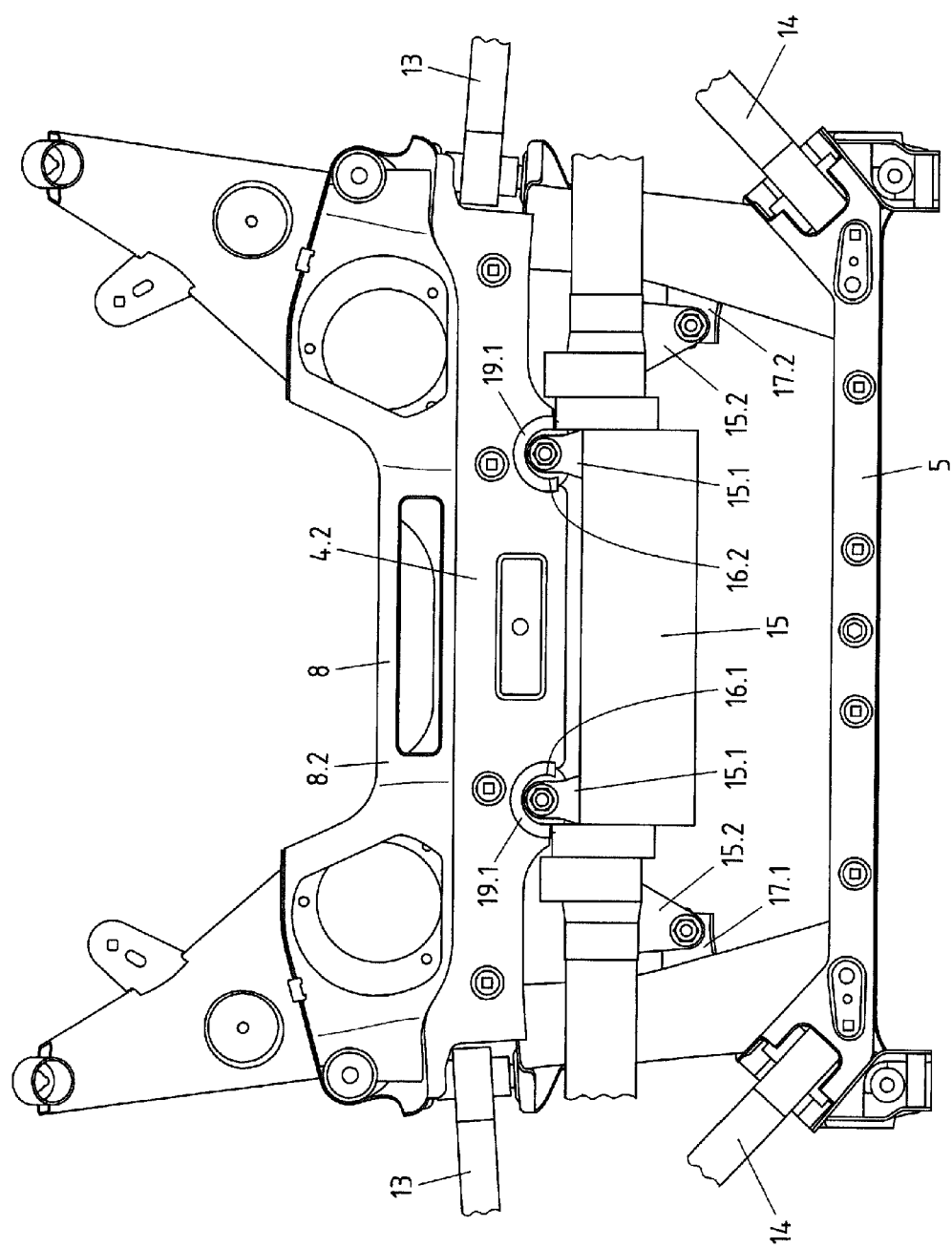
FIG. 4 is a view from below of the front axle support from FIG. 1 having the steering system housing fitted thereon and fitted wheel control elements.

Screws inserted into holes or apertures made in fastening tabs 15.1 attached to the steering system housing 15 or in provided fastening lugs 15.2 are screwed in each case into the nuts 18 attached to the bracket plates 17.1, 17.2 and into the threaded bushes or nuts 21 attached to the shaped metal parts (cf. FIG. 4).

Furthermore, it can be seen in particular in FIG. 3 that the upper sheet metal shell 4.1 of the crossmember has a shoulder 4.11 at the top in the region of the cavity (hollow). The shoulder 4.11 helps to stiffen the crossmember 4 and is defined by a ridge-shaped or bead-shaped raised portion (structure) 4.12 on the upper sheet metal shell 4.1. In this case, the ridge-shaped or bead-shaped raised portion 4.12 is characterised by a curved longitudinal progression.

The shaped metal parts 19 on the one hand and the upper sheet metal shell 4.1 or the lower sheet metal shell 4.2 on the other are preferably made of sheet steel of different thicknesses and/or of different grades in order to optimise the flexural rigidity of the front axle support 1, in particular of the crossmember 4, while keeping the weight low. In addition or alternatively, the upper sheet metal shell 4.1 and the lower sheet metal shell 4.2 can be made of sheet steel of different thicknesses and/or of different grades.

The sheet thicknesses of the steel sheets used to produce the front axle support 1 are preferably within the range of from 1.5 mm to 3.5 mm. The grades of the steel sheets used can, for example, be standard grades such as S355MC and/or S420MC, but may also be tougher sheet steel grades.

The implementation of the invention is not limited to the embodiment shown in the drawings, but rather numerous variants are conceivable that make use of the invention set out in the accompanying claims, even if they differ in design from the example shown. For example, the crossmember 4 formed as a hollow body can also be composed of or consist of a C-profile or a U-profile having a covering connecting the legs thereof, or a tubular profile, in particular a square hollow profile.

The invention claimed is:

1. A front axle support for a motor vehicle, comprising side members and a crossmember interconnecting the side members, the crossmember being in the form of a hollow body and being provided with at least one attachment device for attaching a steering system housing, wherein the attachment device is formed by a shaped metal part which defines a recess,
    wherein the attachment device is inserted into a cavity arranged in the front or back of the crossmember and welded to the crossmember,
    wherein the attachment device is open on an underside thereof and along a vertical portion of at least 20 mm, and
    wherein the attachment device comprises an opening at the upper end of the vertical portion, for receiving a fastening element that is or can be connected to the steering system housing.

2. The front axle support according to claim 1, wherein the shaped metal part is in the form of a channel-shaped shell.

3. The front axle support according to claim 1, wherein the shaped metal part comprises a flange on its lower end.

4. The front axle support according to claim 1, wherein the shaped metal part is produced by splitting a metal sleeve or a sheet metal bowl.

5. The front axle support according to claim 1, wherein the fastening element is rigidly or detachably connected to the attachment device.

6. The front axle support according to claim 1, wherein the fastening element is in the form of a nut or a threaded bush.

7. The front axle support according to claim 1, wherein the opening for receiving the fastening element is formed in a cover-like metal plate that is rigidly connected to the shaped metal part.

8. The front axle support according to claim 7, wherein the metal plate and the crossmember are welded together.

9. The front axle support according to claim 1, wherein the shaped metal part is inserted into the cavity in the crossmember with radial play.

10. The front axle support according to claim 1, wherein the crossmember has a shoulder at the top in the region of the cavity.

11. The front axle support according to claim 10, wherein the shoulder is defined by a ridge-shaped or bead-shaped raised portion of the crossmember.

12. The front axle support according to claim 11, wherein the ridge-shaped or bead-shaped raised portion has a curved longitudinal progression.

13. The front axle support according to claim 1, wherein the crossmember is provided with at least two attachment devices.

14. The front axle support according to claim 1, wherein the crossmember is formed from an upper sheet metal shell and a lower sheet metal shell.

15. The front axle support according to claim 1, wherein the shaped metal part and at least one sheet metal shell and/or at least one profiled part of the crossmember are made of sheet steel of different thicknesses and/or of different grades.

* * * * *